(12) United States Patent
Takemura

(10) Patent No.: US 9,461,933 B2
(45) Date of Patent: Oct. 4, 2016

(54) VIRTUAL SERVER SYSTEM, MANAGEMENT SERVER DEVICE, AND SYSTEM MANAGING METHOD

(75) Inventor: Toshinori Takemura, Tokyo (JP)

(73) Assignee: NEC CORPORATION, Tokyo (JP)

(*) Notice: Subject to any disclaimer, the term of this patent is extended or adjusted under 35 U.S.C. 154(b) by 132 days.

(21) Appl. No.: 14/002,486

(22) PCT Filed: Nov. 7, 2011

(86) PCT No.: PCT/JP2011/006219
§ 371 (c)(1),
(2), (4) Date: Aug. 30, 2013

(87) PCT Pub. No.: WO2012/117471
PCT Pub. Date: Sep. 7, 2012

(65) Prior Publication Data
US 2014/0019623 A1    Jan. 16, 2014

(30) Foreign Application Priority Data

Mar. 1, 2011    (JP) .................................. 2011-044150

(51) Int. Cl.
*G06F 15/16* (2006.01)
*H04L 12/911* (2013.01)
*G06F 9/50* (2006.01)

(52) U.S. Cl.
CPC ............... *H04L 47/70* (2013.01); *G06F 9/505* (2013.01); *G06F 9/5077* (2013.01)

(58) Field of Classification Search
CPC .. G06F 9/5072; G06F 9/5055; G06F 3/0655; G06F 8/60; G06F 9/45558; G06F 9/505; G06F 9/5077; H04L 47/70; H04L 41/50; H04L 67/10; H04L 41/0806; H04L 47/745; H04L 67/16; H04L 41/5041; H04L 41/5045; H04L 47/741; H04L 67/1008; H04L 41/0803
USPC .................................................. 709/226–245
See application file for complete search history.

(56) References Cited

U.S. PATENT DOCUMENTS 7,941,510 B1 *  5/2011  Tormasov et al. ............ 709/220
8,245,140 B2 *  8/2012  Barber et al. ................. 715/735

(Continued)

FOREIGN PATENT DOCUMENTS

JP    2007-272263 A    10/2007
JP    2007-323245 A    12/2007

(Continued)

OTHER PUBLICATIONS

International Search Report for PCT/JP2011/006219 filed Jan. 24, 2012.

*Primary Examiner* — David Lazaro
*Assistant Examiner* — Berhanu Shitayewoldetsadi
(74) *Attorney, Agent, or Firm* — Sughrue Mion, PLLC

(57) ABSTRACT

A management server device in a virtual server system includes: a unit that collects load data from plural physical server devices; a unit that calculates the amount of resource available in each of the physical server devices using the collected load data; a unit that calculates a resource allocation amount for the managing virtual server so as to fall within the range of the calculated amount of resource available; and a unit that instructs a physical server device on which the managing virtual server is running to allocate the resource with the calculated resource allocation amount for the managing virtual server.

5 Claims, 6 Drawing Sheets

(56) References Cited

U.S. PATENT DOCUMENTS

| | | | |
|---|---|---|---|
| 8,576,852 B2 * | 11/2013 | Arisoylu et al. | 370/395.2 |
| 8,635,318 B1 * | 1/2014 | Shankar et al. | 709/223 |
| 8,713,139 B1 * | 4/2014 | Kasper et al. | 709/221 |
| 8,717,885 B2 * | 5/2014 | Arisoylu et al. | 370/230 |
| 8,788,668 B2 * | 7/2014 | Takemura | 709/226 |
| 8,811,183 B1 * | 8/2014 | Anand et al. | 370/237 |
| 8,825,867 B2 * | 9/2014 | Arisoylu et al. | 709/226 |
| 8,879,550 B2 * | 11/2014 | Anand et al. | 370/389 |
| 8,923,122 B2 * | 12/2014 | Anand et al. | 370/230.1 |
| 8,924,964 B2 * | 12/2014 | Kodi et al. | 718/1 |
| 8,966,038 B2 * | 2/2015 | Takemura | 709/223 |
| 8,995,277 B2 * | 3/2015 | Anand et al. | 370/237 |
| 9,009,165 B2 * | 4/2015 | Anand et al. | 707/747 |
| 9,021,046 B2 * | 4/2015 | Mayo et al. | 709/213 |
| 2005/0120160 A1 * | 6/2005 | Plouffe | G06F 9/45537 711/1 |
| 2007/0233838 A1 * | 10/2007 | Takamoto et al. | 709/223 |
| 2007/0283009 A1 | 12/2007 | Takemura | |
| 2010/0312893 A1 * | 12/2010 | Watanabe et al. | 709/226 |

FOREIGN PATENT DOCUMENTS

| | | |
|---|---|---|
| JP | 2010-26828 A | 2/2010 |
| JP | 2010-113677 A | 5/2010 |
| JP | 2010-282420 A | 12/2010 |
| WO | 2010/064394 A1 | 6/2010 |

* cited by examiner

VIRTUAL SERVER SYSTEM, MANAGEMENT SERVER DEVICE, AND SYSTEM MANAGING METHOD

CROSS REFERENCE TO RELATED APPLICATIONS

This application is a National Stage of International Application No. PCT/JP2011/006219 filed Nov. 7, 2011, claiming priority based on Japanese Patent Application No. 2011-044150 filed Mar. 1, 2011, the contents of all of which are incorporated herein by reference in their entirety.

TECHNICAL FIELD

The present invention relates to a technique for managing plural virtual servers running on plural physical servers and plural physical server devices.

BACKGROUND ART

In recent years, virtual server techniques have been progressing and proliferating. In the virtual server techniques, plural virtual servers are configured on one physical computer using software, and the plural virtual servers perform plural processes in parallel. With the virtual server techniques, it is possible to configure a virtual server system in which plural virtual servers are run at the same time using plural computers connected through a communication network.

Hereinafter, a physical computer is also referred to as a physical server device to distinguish the virtual server from the physical computer.

The virtual server system as described above employs a technique in which virtual servers are integrated using available resources in the physical server device. For example, Patent Document 1 proposes a virtual server system in which a managing virtual server together with other virtual servers are formed on a physical server device having a large amount of available resources, while a physical server designed specifically for management is operated as a management server device in the previous technique. With this method, it is possible to reduce the number of physical server devices. Further, Patent Document 2 proposes a virtual server system in which a virtual machine is transferred between host machines (management units of the virtual machine) on the basis of the amount of resources used for services.

RELATED DOCUMENT

Patent Document

Patent Document 1: Japanese Patent Application Laid-open No. 2010-026828
Patent Document 2: Japanese Patent Application Laid-open No. 2010-113677

SUMMARY OF THE INVENTION

However, in the virtual server systems as described above, with the increase in the size of the system, the amount of operation management data processed in the managing virtual server increases, possibly leading to a case where the physical server device cannot provide sufficient resources necessary for the managing virtual server. Further, in the conventional virtual server system, the operation management data are collected in the managing virtual server, possibly leading to the occurrence of a bottleneck in the analyzing process performed for the operation management data in the managing virtual server.

In view of the problems described above, an object of the present invention is to provide a technique for efficiently and appropriately managing plural virtual servers running on plural physical servers and plural physical server devices.

Each aspect of the present invention employs the following configurations to solve the problems described above.

A first aspect of the present invention relates to a virtual server system having plural physical server devices that run plural virtual servers, and a management server device that can communicate with the plural physical server devices. In the virtual server system according to the first aspect, each of the physical server devices runs at least one of the plural virtual servers so as to function as a managing virtual server performing an analyzing process for data acquired from each of the plural physical server devices and another virtual server running on the physical server device. Further, in the virtual server system according to the first aspect, the management server device includes: a data collecting unit that collects load data from the plural physical server devices; an available-amount calculating unit that calculates an amount of resource available in each of the physical server devices using the load data collected by the data collecting unit; an allocation-amount calculating unit that calculates a resource allocation amount for the managing virtual server so as to fall within a range of the amount of resource available calculated by the available-amount calculating unit; an allocation instructing unit that instructs a physical server device on which the managing virtual server is running to allocate, for the managing virtual server, a resource with the resource allocation amount calculated by the allocation-amount calculating unit.

A second aspect of the present invention relates to a system managing method performed by a virtual server system including plural physical server devices that each run plural virtual servers and a management server device that can communicate with the plural physical server devices. In the system managing method according to the second aspect, each of the physical server devices runs at least one virtual server of the plural virtual servers so as to function as a managing virtual server that performs an analyzing process for data acquired from each of the physical server devices and another virtual server running on the physical server device. Further, in the system managing method according to the second aspect, the management server device: collects load data from the plural physical server devices; calculates an amount of resource available in each of the physical server devices using the collected load data; calculates a resource allocation amount for the managing virtual server so as to fall within a range of the calculated amount of resource available; and instructs a physical server device that runs the managing virtual server to allocate a resource with the calculated resource allocation amount to the managing virtual server.

It should be noted that, as another aspect of the present invention, the present invention may provide a management server device contained in the first aspect of the present invention, may provide a program that causes a computer to realize each of the elements in the management server device, and may be a computer-readable storage medium that stores such a program. This storage medium includes a non-transitory tangible media.

According to the aspects of the present invention described above, it is possible to provide a technique for appropriately and efficiently managing plural virtual servers running on plural physical servers and plural physical server devices.

DESCRIPTION OF EMBODIMENTS

Figure 1:
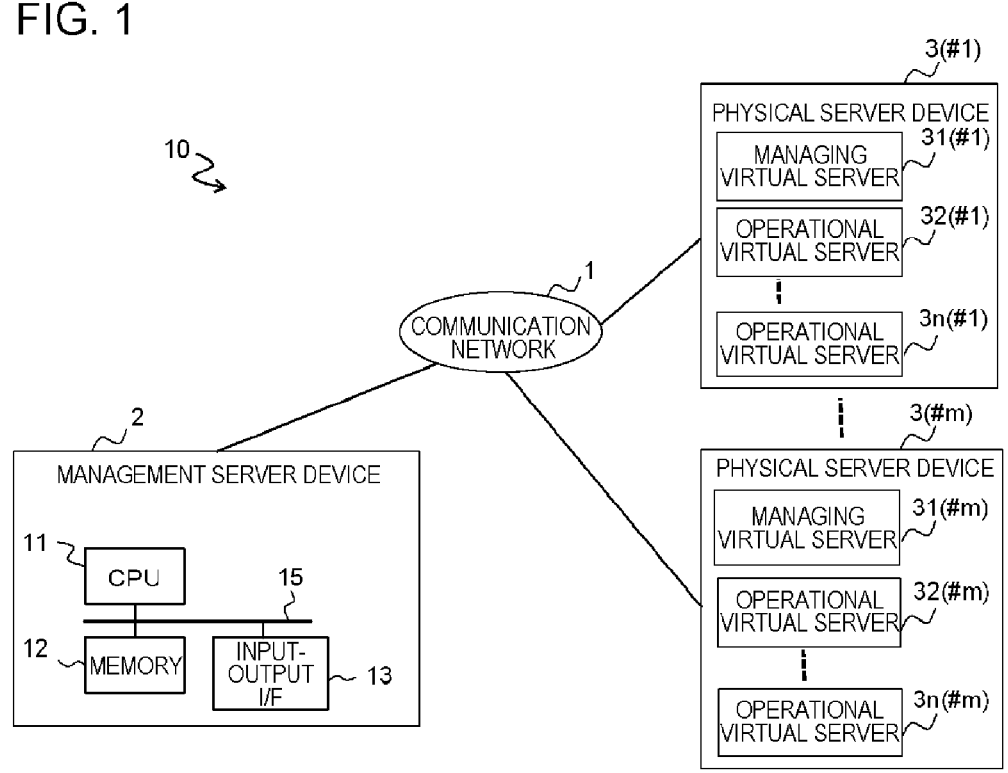
FIG. 1 is a schematic view illustrating an example of a configuration of a virtual server system according to a first exemplary embodiment.

Hereinbelow, exemplary embodiments according to the present invention will be described. Note that each exemplary embodiment described below is merely an example, and the present invention is not limited to the configurations in the following exemplary embodiments.

The virtual server system according to this exemplary embodiment includes: plural physical server devices that each run plural virtual servers including a managing virtual server performing an analyzing process for data acquired from a physical server device and another virtual server running on the physical server device; and a management server device that can communicate with the plural physical server devices. The management server device includes a data collecting unit that collects load data from the plural physical server devices, an available-amount calculating unit that calculates an amount of resource available in each of the physical server devices using the load data collected by the data collecting unit, an allocation-amount calculating unit that calculates a resource allocation amount for the managing virtual server within a range of the amount of resource available calculated by the available-amount calculating unit, and an allocation instructing unit that instructs a physical server device on which the managing virtual server is running to allocate, for the managing virtual server, a resource with the resource allocation amount calculated by the allocation-amount calculating unit.

In this specification, data acquired by the managing virtual server include data collected from the physical server device on which this managing virtual server itself is running, and another virtual server running on this physical server device, and are also referred to as operation management data hereinafter. The operation management data includes, for example, failure history information, information on operating history of a virtual server, information on applications running on the virtual server, and load information. Further, the analyzing process for the operation management data described above includes, for example, analyzing performance, estimating changes in loads, and estimating the resource amount (capacity planning). Note that this exemplary embodiment does not limit the operation management data acquired by the managing virtual server or the analyzing process for the operation management data.

In this exemplary embodiment, the load data are collected from plural physical server devices; using the collected load data, an amount of resource available in each of the physical server devices is calculated; and, using the calculated amount of resource available, the resource allocation amount for the managing virtual server running on each of the physical server devices is calculated. Then, the management server device according to this exemplary embodiment gives an instruction to each of the physical server devices, whereby each of the physical server devices allocates the resources with the calculated resource allocation amount to the managing virtual servers.

As described above, in this exemplary embodiment, the resources available in each of the physical server devices are used to run each of the managing virtual servers that each perform an analyzing process for data acquired from the physical server devices and the virtual servers. In other words, according to this exemplary embodiment, it is possible to efficiently distribute the analyzing process for the data concerning the physical server device and the virtual servers to the plural physical server devices.

According to this exemplary embodiment, the analyzing process is efficiently distributed as described above, thereby avoiding a phenomenon in which sufficient resources cannot be allocated to perform the analyzing process, or a phenomenon in which the analyzing process serves as the bottleneck of processing performance of the entire system. Further, by distributing the analyzing process, it is possible to reduce the processing load carried by the management server device as compared with the conventional system in which management server devices integrally perform the analyzing process. Yet further, in this exemplary embodiment, the analyzing process is performed for data (operation management data) acquired in each of the physical server devices. Thus, it is possible to reduce the communication load as compared with the conventional system in which data subjected to the analyzing process are sent/received between each of the physical server devices and the management server device.

Thus, according to this exemplary embodiment, it is possible to efficiently and appropriately manage the plural physical server devices and the virtual servers running on each of the physical server devices.

Hereinbelow, the above-described exemplary embodiment will be described in more detail.
[First Exemplary Embodiment]
[System Configuration]

FIG. 1 is a schematic view illustrating an example of a configuration of a virtual server system 10 according to a first exemplary embodiment. The virtual server system 10 according to the first exemplary embodiment includes, for example, a management server device 2, and plural physical server devices 3. In FIG. 1, reference character 3 (#1) to reference character 3 (#m) (m is a positive number) are attached to the respective physical server devices 3. The physical server devices 3 (#1) to 3 (#m) have the same functions in terms of functions related to this exemplary embodiment, and hence, are referred to as the physical server device 3 hereinafter except for a case where these devices need to be separately treated.

The management server device 2 and each of the physical server devices 3 are connected through a communication network 1, and can be communicated with each other. The communication network 1 includes, for example, public networks such as the Internet, a wide area network (WAN), a local area network (LAN), and a wireless network. Note that this exemplary embodiment does not limit the communication form between the management server device 2 and each of the physical server devices 3.

The management server device 2 is a so-called computer, and includes, for example, a central processing unit (CPU) 11, a memory 12, and an input-output interface (I/F) 13, each of which is connected to each other through a bus 15. The memory 12 includes, for example, a random access memory (RAM), a read only memory (ROM), a hard disk, and a portable storage medium. The input-output I/F 13 is connected, for example, to a communication device that communicates with each of the physical server devices 3 through the communication network 1. The input-output I/F 13 may be connected to a user interface device such as a display device and an input device. Note that this exemplary embodiment does not limit a hardware configuration of the management server device 2.

The physical server device 3 is also a so-called computer, and includes a CPU, a memory, and an input-output I/F (not illustrated) as is the case with the management server device 2. The physical server device 3 realizes server virtualization with the CPU running a program stored in the memory. This server virtualization is realized, for example, by a virtual machine monitor (hereinafter, referred to as a virtual machine monitor (VMM)). In such a case, the VMM emulates one physical server device 3 as a virtual machine to run plural guest operating systems (OS). Plural types of techniques of the above-described virtualization technique have been known, and hence, this exemplary embodiment does not limit the server virtualization technique itself.

With the above-described virtualization technique, the physical server device 3 runs plural virtual servers. The plural virtual servers described above include a managing virtual server that performs an analyzing process for data (operation management data) acquired from the physical server device 3 running this virtual server and another virtual server running on the same physical server device 3. In FIG. 1, the managing virtual servers are denoted as the reference character 31 (#1) to the reference character 31 (#m). The managing virtual servers 31 (#1) to 31 (#m) have the same functions, and hence, are referred to as the managing virtual server 31 except for the case where these servers need to be separately treated.

In this exemplary embodiment, the plural virtual servers running on the physical server device 3 are categorized into the managing virtual server 31 described above and other virtual servers serving as a target of the data analyzing process performed by this managing virtual server 31. In FIG. 1, the other virtual servers are each referred to as an operational virtual server. This exemplary embodiment does not limit the other virtual servers to the operational virtual server, provided that these virtual servers are serving as the target of the data analyzing process performed by the managing virtual server 31. In other words, processes performed on the other virtual servers are not limited. In FIG. 1, the operational virtual servers are referred to as the reference character 32 (#1) to the reference character 3n (#1), and the reference character 32 (#m) to the reference character 3n (#m). These operational virtual servers have the same functions in terms of functions related to this exemplary embodiment, and hence, are referred to as an operational virtual server 32 hereinafter except for a case where these virtual servers need to be separately treated. Note that, for the functions irrelevant to this exemplary embodiment, the operational virtual servers 32 may have different functions from each other.

The management server device 2 and the physical server devices 3 in the virtual server system 10 share identification information with which the management server device 2, each of the physical server devices 3, each of the virtual servers (the managing virtual server 31 and the operational virtual server 32) can be identified. The identification information may be an internet protocol (IP) address or a host name used for communication, or may be unique information defined by this virtual server system 10. The identification information may have any form that can separately identify devices and virtual servers and can be communicated to other devices and other virtual servers as communication destinations. Thus, in the following description, the method of identifying each node using the identification information will be omitted.

[Device Configuration]

Figure 2:
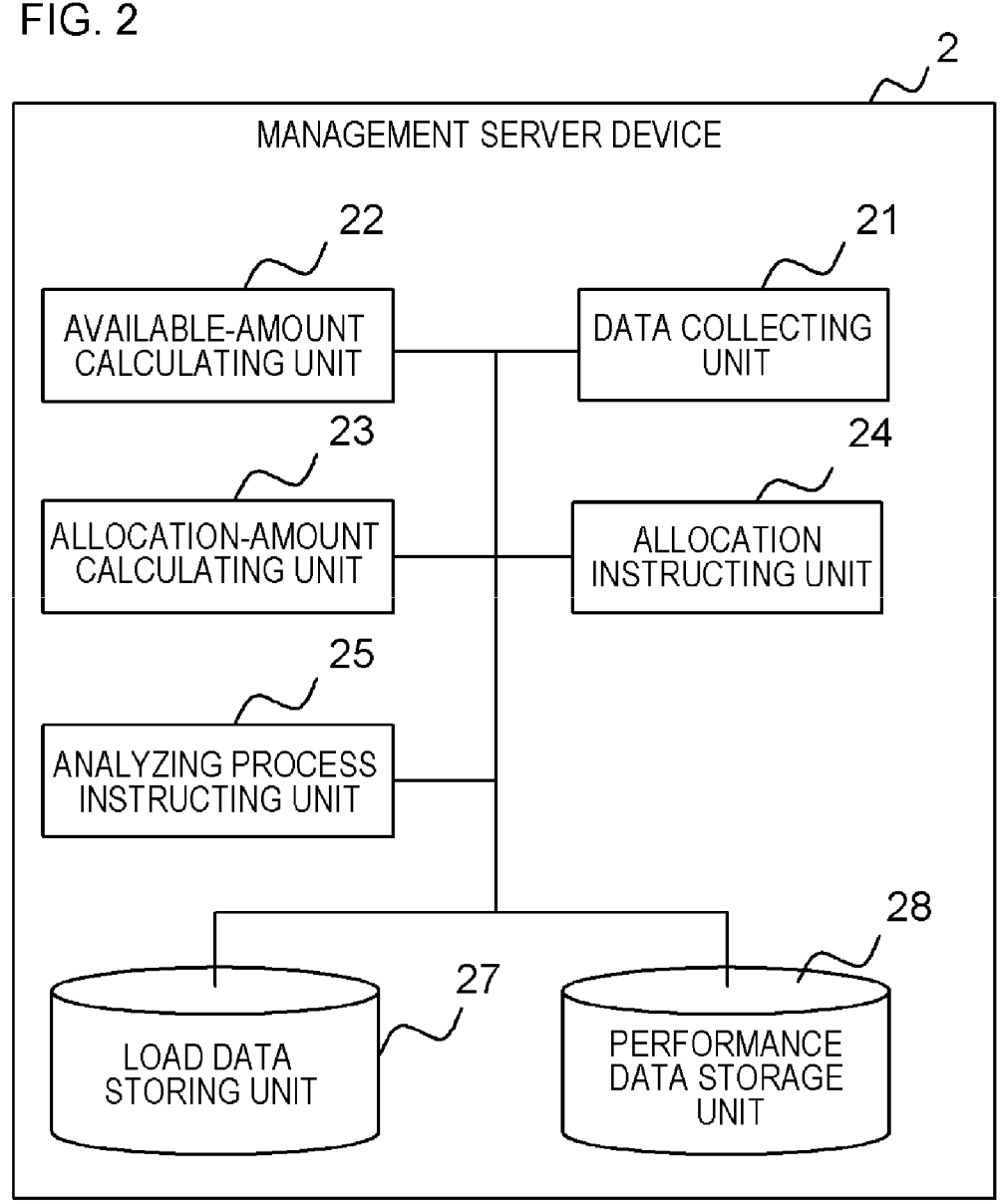
FIG. 2 is a block diagram schematically illustrating an example of a configuration of a management server device according to a first exemplary embodiment.

FIG. 2 is a block diagram schematically illustrating an example of a configuration of the management server device 2 according to the first exemplary embodiment. The management server device 2 according to the first exemplary embodiment includes, for example, a data collecting unit 21, an available-amount calculating unit 22, an allocation-amount calculating unit 23, an allocation instructing unit 24, an analyzing process instructing unit 25, a load data storing unit 27, and a performance data storage unit 28. These processing units are realized, for example, with the CPU 11 running a program stored in the memory 12. The load data storing unit 27 and the performance data storage unit 28 are realized on the memory 12.

The data collecting unit 21 collects load data from the plural physical server devices 3. More specifically, the data collecting unit 21 sends a data requesting packet through the input-output I/F 13 to a destination such as each of the physical server devices, each of the managing virtual servers 31, and each of the operational virtual servers 32, and receives a response packet containing the load data from each of the physical server devices 3. The load data may be voluntarily transmitted from each of the physical server devices 3 to the management server device 2.

The load data described above are information indicating use states of each of the resources (computer resources) that each of the physical server devices 3 have, and includes, for example, the percentage of CPU used, the number of CPUs, the number of CPU cores, the amount of memory used, the input-output performance value (for example, the ratio of input-output data transfer rate relative to the maximum data transfer rate) of the storage medium, the amount of data stored in the storage medium, and the input-output performance value (for example, transfer rate or used bandwidth) of a communication controlling device. The load data may be called the amount of resource used. This exemplary embodiment does not limit the details of the load data themselves. Thus, the load data to be collected may be any one piece of the information described above, or may be any plural pieces of the information described above, or may be other information.

The load data are collected as load data of each of the physical server devices 3. The load data of each of the physical server devices 3 means the total amount of load data of all the virtual servers running on a physical server device 3 and load data of processes performed on this physical server device 3 except the virtual servers. Thus, the data collecting unit 21 may collect the load data of each of the virtual servers from all the virtual servers of the physical server device 3, collect, from this physical server device 3, the load data of the processes performed on this physical server device 3 except the virtual servers, and add up these collected load data to calculate the load data of the physical server device 3.

The data collecting unit 21 collects the above-described load data at any timings (for example, at predetermined cycles), and stores the collected load data in the load data storing unit 27 as history data.

For each of the physical server devices 3, the load data storing unit 27 stores the history of the load data collected by the data collecting unit 21 and the maximum process performance value. The maximum process performance value means the maximum value of the amount of resource that each of the physical server devices 3 has, in other words, the maximum value of the amount of resources available. The maximum process performance value of each of the physical server devices 3 may be stored in the load data storing unit 27 in advance, or may be collected by the data collecting unit 21 from each of the physical server devices 3.

The available-amount calculating unit 22 calculates the amount of resources available in each of the physical server devices 3 using the load data collected by the data collecting unit 21. For example, the available-amount calculating unit 22 subtracts the load data from the maximum process performance value to calculate the amount of resources available in each of the physical server devices 3. The amount of resources available may be calculated using the instant value at a certain point in time, in other words, using one piece of load data, or may be calculated using an average value of the load data in a certain period of time stored in the load data storing unit 27, or may be calculated using the maximum value in a certain period of time of all the load data stored in the load data storing unit 27.

The allocation-amount calculating unit 23 calculates a resource allocation amount for each of the managing virtual servers 31 so as to fall within a range of the amount of resource available calculated by the available-amount calculating unit 22. More specifically, the allocation-amount calculating unit 23 calculates the amount of resource allocable for each of the physical server devices 3 using the amount of resource available, thereby determining the resource allocation amount so as to be less than the amount of resource allocable. The amount of resources that can be allocated can be calculated, for example, by subtracting, from the amount of resources available, a product of the maximum process performance value and a percentage value (for example, 20%) of the maximum amount of resources not available relative to the maximum process performance value. Further, as for the amount of resource allocable, it may be possible to use the amount of resource available without applying processing.

Further, as the more specific method of determining the resource allocation amount, the following methods can be employed. The first method is to determine, as the resource allocation amount, the amount of resource allocable without applying processing. The second method is to multiply the amount of resource allocable by a predetermined coefficient to determine the resource allocation amount. The third method and the fourth method are to calculate the total amount of resources necessary for the managing virtual server 31 to perform an analyzing process for operation management data, and use the total amount of resources to determine the resource allocation amount.

The total resource amount can be calculated by multiplying the amount of resources allocated to the managing virtual server 31 by the processing time consumed to perform an analyzing process for the operation management data in the managing virtual server 31. With regard to the amount of resources allocated to the managing virtual server 31, the resource allocation amount that is previously calculated by the allocation-amount calculating unit 23 and is actually allocated to the managing virtual server 31 by the allocation instructing unit 24 is used. This resource allocation amount is acquired by the performance data storage unit 28. The processing time is a period of time measured by the analyzing process instructing unit 25, and is acquired from the performance data storage unit 28.

In the third method, the above-described total resource amount is divided by the amount of resource allocable, thereby estimating the processing time consumed in the analyzing process in the case where the amount of resource allocable is actually allocated to the managing virtual server 31, and the resource allocation amount is determined so that this processing time is less than a predetermined processing time (for example, target processing time) retained in advance. For example, if the processing time estimated on the basis of the amount of resource allocable is less than the predetermined processing time, the amount of resource allocable is determined to be the resource allocation amount without applying any processes.

In the fourth method, a value obtained by dividing the above-described total resource amount by a predetermined processing time is determined to be the resource allocation amount. This fourth method is effective in a case where the managing virtual server 31 is caused to perform the analyzing process for the operation management data using the whole of the predetermined processing time. The allocation-amount calculating unit 23 uses at least one of the plural methods described above to calculate the resource allocation amount for each of the managing virtual servers 31. Note that these methods may be switched for every physical server device 3 or every managing virtual server 31.

The allocation instructing unit 24 instructs each of the physical sever devices 3 on which each of the managing virtual servers 31 runs to allocate the resource with the resource allocation amount calculated by the allocation-amount calculating unit 23 to each of the managing virtual servers 31. More specifically, the allocation instructing unit 24 transfers an instruction packet containing data indicating the resource allocation amount through the input-output I/F 13 to each of the physical server devices 3. With this configuration, the VMM or host OS of each of the physical server devices 3 allocates the resource with the resource allocation amount to the managing virtual server 31 serving as the target in accordance with the instruction packet.

The analyzing process instructing unit 25 instructs each of the managing virtual servers 31 to perform the analyzing process for the operation management data, and acquires the processing time consumed in the analyzing process performed by each of the managing virtual servers 31. The analyzing process instructing unit 25 may measure, for example, the time from transmission of the instruction to perform the analyzing process to reception of notification from the managing virtual server 31 indicating completion of the analyzing process, and set the measured time to the processing time, or may acquire the processing time measured by the managing virtual server 31 from the managing virtual server 31. The analyzing process instructing unit 25 stores, in the performance data storage unit 28, the acquired processing time consumed in the analyzing process for the operation management data.

The performance data storage unit 28 stores the processing time consumed in the analyzing process for the operation management data in each of the managing virtual servers 31, and the resource allocation amount allocated to each of the managing virtual servers 31.

[Example of Operation]

Figure 3:
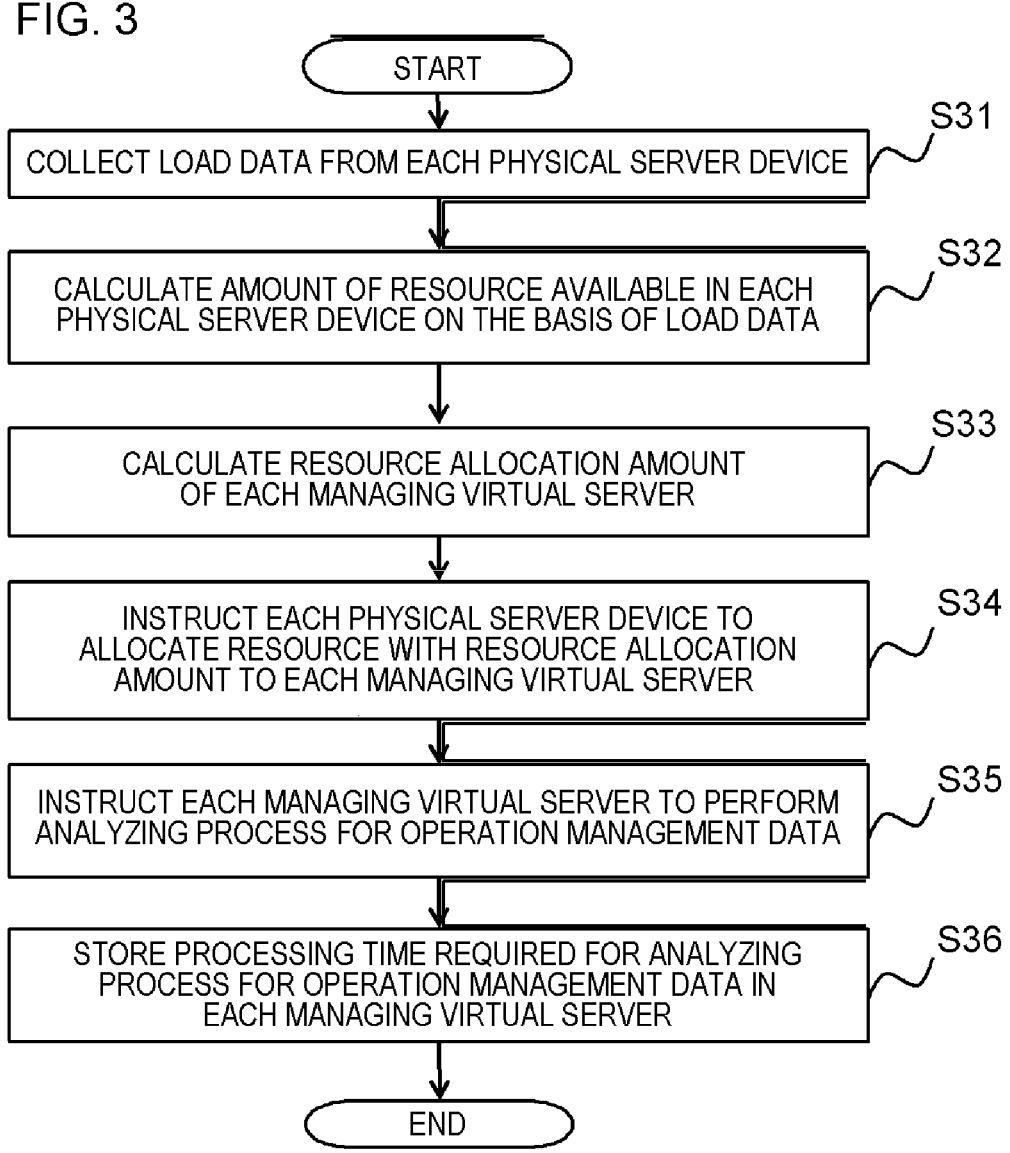
FIG. 3 is a flowchart showing an example of an operation performed by the management server device according to the first exemplary embodiment.

FIG. 3 is a flowchart showing an example of an operation performed by the management server device 2 according to the first exemplary embodiment.

In the management server device 2, the data collecting unit 21 collects load data from each of the physical server devices 3 (from 3(#1) to 3(#m)) (S31). The collected load data are stored in the load data storing unit 27.

The available-amount calculating unit 22 calculates the amount of resources available in each of the physical server devices 3 (S32) using the load data collected by the data collecting unit 21 and the maximum process performance value of each of the physical server devices 3. The maximum process performance value is acquired, for example, from the load data storing unit 27.

The allocation-amount calculating unit 23 calculates a resource allocation amount for each of the managing virtual servers 31 so as to fall within a range of the amount of resources available calculated in the above-described process S32 (S33). This resource allocation amount can be calculated by using the maximum process performance value stored in the load data storing unit 27, the processing time for the analyzing process for the operation management data stored in the performance data storage unit 28, the resource allocation amount, and so on, in addition to the amount of resources available.

The allocation instructing unit 24 instructs each of the physical server devices 3 to allocate, for each of the managing virtual servers 31, the resource with the resource allocation amount calculated by the allocation-amount calculating unit 23 (S34). With this instruction, each of the physical server devices 3 allocates the resource with the resource allocation amount contained in the instruction from the management server device 2 for each of the managing virtual servers 31 running on each of the physical server devices 3.

The analyzing process instructing unit 25 instructs each of the managing virtual servers 31 to perform the analyzing process for the operation management data (S35). With this operation, each of the managing virtual servers 31 performs the analyzing process for the operation management data using the resource with the resource allocation amount calculated by the management server device 2.

After giving the instruction of performing the analyzing process, the analyzing process instructing unit 25 acquires the processing time consumed in the analyzing process for the operation management data by each of the managing virtual servers 31, and stores the processing time in the performance data storage unit 28 (S36). The processing time stored in the performance data storage unit 28 may be used for calculating the resource allocation amount as described above.

[Operation and Effect of First Exemplary Embodiment]

As described above, according to the virtual server system 10 according to the first exemplary embodiment, it is possible to distribute the analyzing process for the operation management data to the managing virtual servers 31 running on each of the physical server devices 3. Further, in the first exemplary embodiment, the resource with the resource allocation amount appropriately determined within the amount of resources available in each of the physical server devices 3 is allocated to each of the managing virtual servers 31 that performs the analyzing process for the operation management data.

Thus, according to the first exemplary embodiment, even in the case where the number of the physical server devices 3 and the amount of operation management data increase, it is possible to efficiently perform the analyzing process without newly adding an operation management server for the analyzing process, by effectively using the amount of resource available.

Further, in the first exemplary embodiment, for each of the managing virtual servers 31, the performance data storage unit 28 stores the amount of resources actually allocated (resource allocation amount), and the processing time consumed in the analyzing process in response to this amount of resource, whereby it is possible to calculate the resource allocation amount for each of the managing virtual servers 31 using these pieces of information. With the mode as described above, it is possible to accurately calculate the resource allocation amount of each of the managing virtual servers 31.

[Second Exemplary Embodiment]

In addition to the configuration of the first exemplary embodiment, the virtual server system 10 according to a second exemplary embodiment further includes a configuration that can outsource an analyzing process for operation management data to another managing virtual server 31. Hereinbelow, the virtual server system 10 according to the second exemplary embodiment will be described with focus being placed on things different from the first exemplary embodiment, and explanation of things similar to those in the first exemplary embodiment will be omitted as appropriate.

Figure 4:
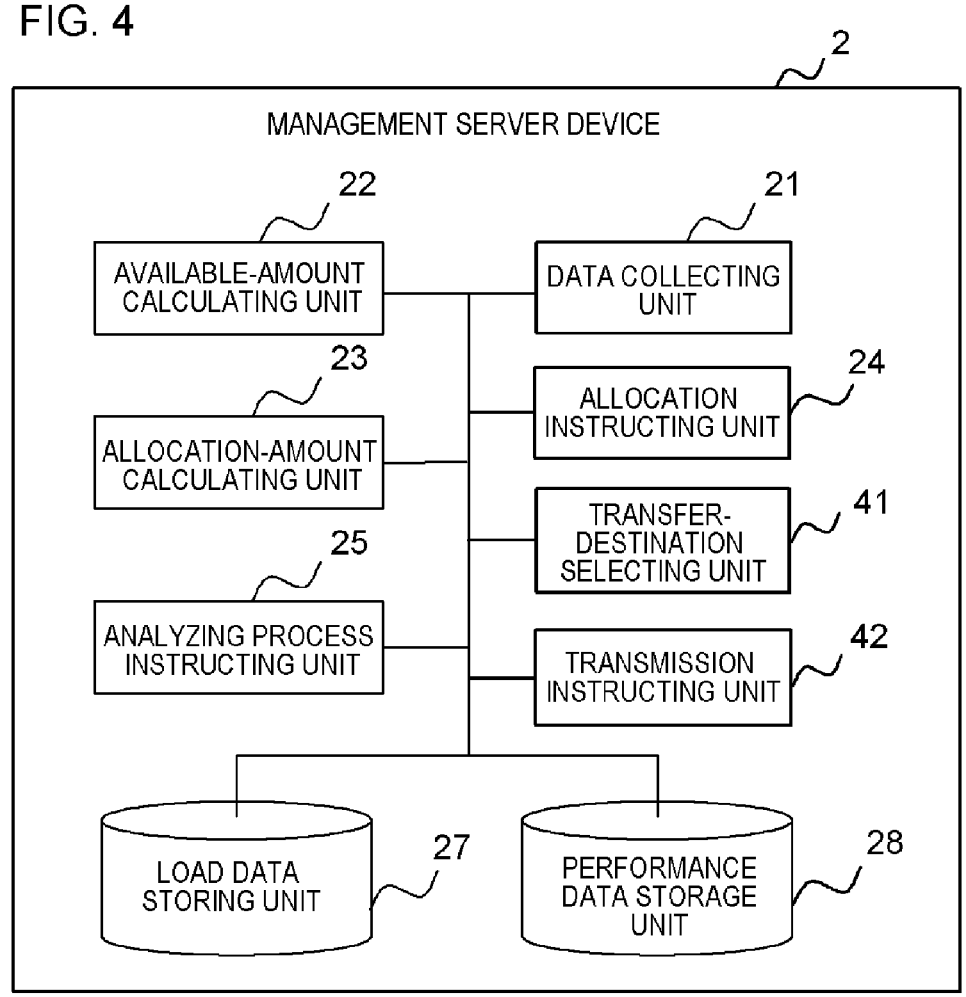
FIG. 4 is a block diagram schematically illustrating an example of a configuration of a management server device according to a second exemplary embodiment.

FIG. 4 is a block diagram schematically illustrating an example of a configuration of a management server device 2 according to the second exemplary embodiment. In addition to the configuration of the first exemplary embodiment, the management server device 2 according to the second exemplary embodiment further includes a transfer-destination selecting unit 41 and a transmission instructing unit 42. These additional processing units are also realized, for example, with the CPU 11 running a program stored in the memory 12.

In addition to the load data described above, the data collecting unit 21 collects information on the amount of operation management data stored in each of the managing virtual servers 31 from the plural physical server devices 3. Note that, although it is described in this exemplary embodiment that information is collected from the plural physical server devices 3, the main performer of communication is, in a logical sense, each of the managing virtual servers 31 running on each of the physical server devices 3. The collected information on the amount of operation management data together with the load data is stored in the load data storing unit 27.

The allocation-amount calculating unit 23 uses, for example, the information on the amount of operation management data collected by the data collecting unit 21, and information stored in the load data storing unit 27 and the performance data storage unit 28 to calculate the resource allocation amount for each of the managing virtual servers 31. In this exemplary embodiment, since the analyzing processes for the operation management data of the same type are performed on the same physical server device 3, it can be defined that the amount of operation management data is proportional to the time required for analyzing the operation management data if the resource allocation amount is constant. Similarly, it can be defined that the time required for analyzing the operation management data is inversely proportional to the resource allocation amount if the amount of the operation management data is constant, and the amount of the operation management data is proportional to the resource allocation amount if the analyzing process time is constant.

On the basis of the above-described relationships, the allocation-amount calculating unit 23 uses a history of the amount of operation management data stored in the load data storing unit 27, and a history of the resource allocation amount stored in the performance data storage unit 28 to calculate the resource allocation amount corresponding to the amount of operation management data newly collected by the data collecting unit 21. Note that it may be possible to employ a configuration in which the allocation-amount calculating unit 23 calculates the resource allocation amount for each of the managing virtual servers 31 through a method similar to the first exemplary embodiment without using the amount of the operation management data.

After calculating the resource allocation amount for each of the managing virtual servers 31 as described above, the allocation-amount calculating unit 23 estimates processing time consumed in the analyzing process for the operation management data by each of the managing virtual servers 31 to which the resource with the calculated resource allocation amount is allocated. This analyzing process time may be calculated by dividing the total resource amount described in the first exemplary embodiment by the calculated resource allocation amount, or may be estimated by using a past history of the analyzing process time and the resource allocation amount on the basis of the proportional relationship between the time required for the analyzing process for operation management data and the resource allocation amount.

The allocation-amount calculating unit 23 determines a managing virtual server 31 having the analyzing process time estimated to exceed a predetermined upper limit time, to be a managing virtual server 31 serving as a transfer target from among all the managing virtual servers 31. This predetermined upper limit time is determined and retained in advance, for example, in accordance with the intervals at which the managing virtual server 31 performs the analyzing process for the operation management data.

In the case where the managing virtual server 31 serving as the transfer target exists, the allocation-amount calculating unit 23 requests a transfer-destination selecting unit 41 to perform a process related to the managing virtual server 31 serving as the transfer target, and acquires information on the transfer-destination managing virtual server 31 and information on excess data amount from the transfer-destination selecting unit 41. The allocation-amount calculating unit 23 assumes that the excess data amount is transferred to the transfer-destination managing virtual server 31, and re-calculates the resource allocation amount for the transfer-destination managing virtual server 31.

More specifically, for the transfer-destination managing virtual server 31, the allocation-amount calculating unit 23 obtains the total data amount including the amount of newly collected operation management data and the excess data amount, and calculates the resource allocation amount corresponding to this total data amount so as to fall within the range of the amount of resource allocable. This calculation process is performed by using the history of the amount of operation management data stored in the load data storing unit 27 and the history of the resource allocation amount stored in the performance data storage unit 28 on the basis of the proportional relationships between the amount of the operation management data and the resource allocation amount.

In this exemplary embodiment, the relationships between the amounts of the operation management data, the time required for the analyzing process for the operation management data, and the resource allocation amount can be defined as described above. Thus, it can be defined that the increase in the operation management data renders the analyzing process time exceed the predetermined upper limit time. Hereinafter, the time obtained by subtracting a predetermined upper limit time from the analyzing process time is referred to as excess processing time, and the amount of operation management data corresponding to this excess processing time is referred to as excess data amount.

On the basis of the idea described above, the transfer-destination selecting unit 41 calculates the excess data amount for the managing virtual server 31 serving as the transfer target and determined by the allocation-amount calculating unit 23, and selects another managing virtual server 31 that performs an analyzing process for this excess data amount (hereinafter, referred to as a transfer-destination managing virtual server 31). Note that the selected transfer-destination managing virtual server 31 is run on a physical server device 3 different from the physical server device 3 on which the managing virtual server 31 runs.

The excess data amount is calculated in the following manners. First, the transfer-destination selecting unit 41 estimates the amount of operation management data that can be processed within the predetermined upper limit time, on the basis of the resource allocation amount calculated by the allocation-amount calculating unit 23. This estimation is performed on the basis of the proportional relationships between the amount of the operation management data and the time required for analyzing the operation management data, and is implemented by using the history of the amount of the operation management data stored in the load data storing unit 27 and the history of the analyzing process time stored in the performance data storage unit 28. The transfer-destination selecting unit 41 subtracts the estimated data amount from the amount of the operation management data newly collected from the managing virtual server 31 serving as the transfer target to calculate the excess data amount concerning the managing virtual server 31.

The other managing virtual server 31 is selected in the following manners. The transfer-destination selecting unit 41 obtains the total data amount including the amount of the newly collected operation management data and the excess data amount described above in relation to the other managing virtual server 31 running on another physical server device 3, and estimates the time required for the analyzing process for the operation management data with this total data amount. This estimation is made on the basis of the proportional relationship between the amount of the operation management data and the time required for analyzing the operation management data, and is performed by using the history of the amount of the operation management data stored in the load data storing unit 27 and the history of the analyzing process time stored in the performance data storage unit 28. The transfer-destination selecting unit 41 determines a managing virtual server 31 having the estimated analyzing process time that falls within the predetermined upper limit time, and sets this determined managing virtual server 31 to be a transfer-destination managing virtual server 31.

The transmission instructing unit 42 instructs the managing virtual server 31 serving as the transfer target and determined by the allocation-amount calculating unit 23 to transfer the operation management data with the excess data amount calculated by the transfer-destination selecting unit 41 to the transfer-destination managing virtual server 31 selected by the transfer-destination selecting unit 41. With this operation, the managing virtual server 31 serving as the transfer target and receiving the instruction transmits, to the transfer-destination managing virtual server 31, data corresponding to the excess data amount of the operation management data retained in this managing virtual server 31.

[Example of Operation]

Figure 5:
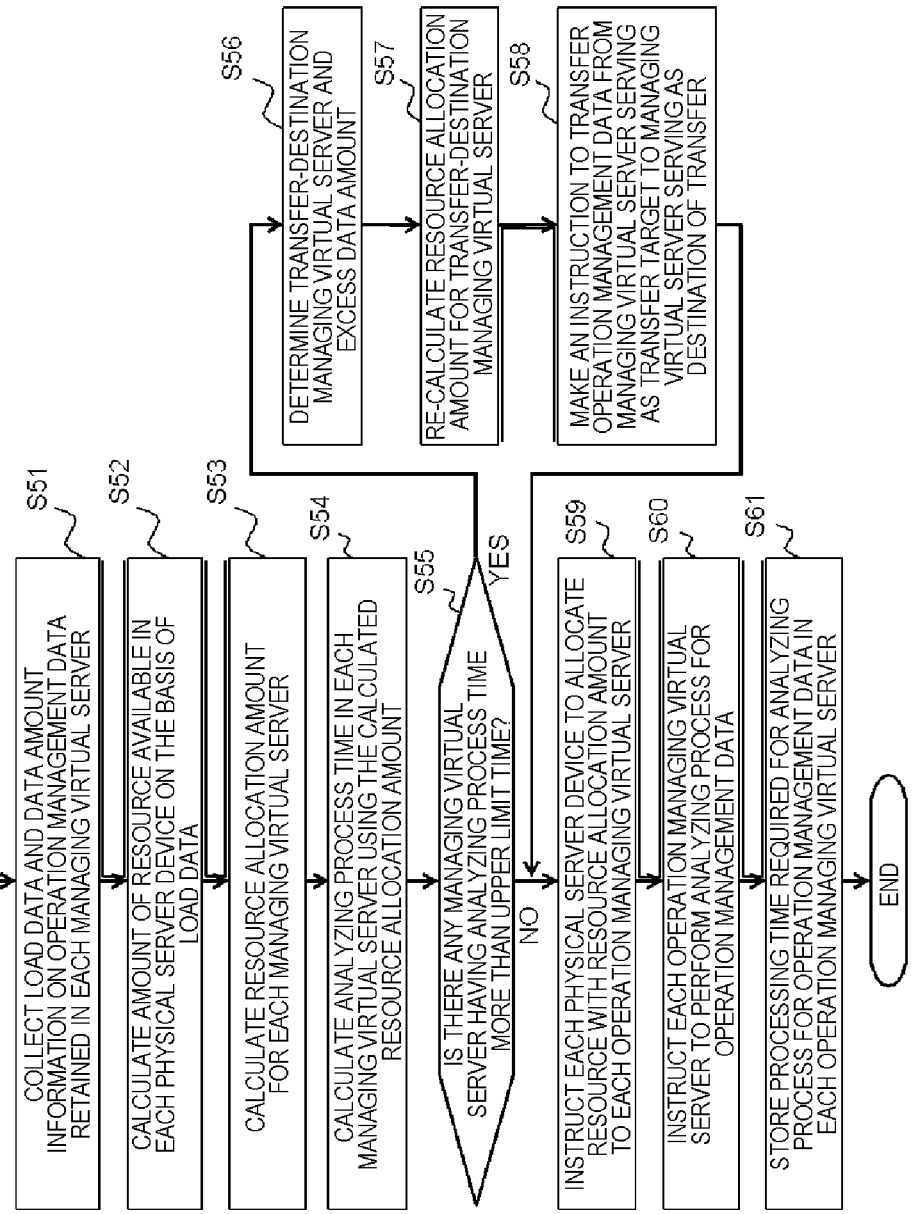
FIG. 5 is a flowchart showing an example of an operation performed by the management server device according to the second exemplary embodiment.

FIG. 5 is a flowchart showing an example of an operation performed by the management server device 2 according to the second exemplary embodiment.

In the management server device 2, the data collecting unit 21 collects load data and information on the amount of operation management data retained in each of the managing virtual servers 31 (from 31 (#1) to 31 (#m)) (S51) from each of the physical server devices 3 (from 3 (#1) to 3 (#m)). Note that, in a logical sense, the information on the amount of operation management data is acquired from each of the managing virtual servers 31. The collected load data and the information on the amount of the operation management data are stored in the load data storing unit 27.

The available-amount calculating unit 22 calculates the amount of resource available in each of the physical server devices 3 (S52) using the load data collected by the data collecting unit 21 and the maximum process performance value of each of the physical server devices 3. The maximum process performance value is acquired, for example, from the load data storing unit 27.

The allocation-amount calculating unit 23 calculates a resource allocation amount for each of the managing virtual servers 31 so as to fall within the range of the amount of resource available calculated in the process S52 (S53). For example, on the basis of the proportional relationship between the amount of operation management data and the resource allocation amount, the allocation-amount calculating unit 23 calculates a resource allocation amount corresponding to the amount of operation management data newly collected by the data collecting unit 21 using a history of the amount of operation management data stored in the load data storing unit 27 and a history of the resource allocation amount stored in the performance data storage unit 28.

Then, the allocation-amount calculating unit 23 estimates the time required for the analyzing process for the operation management data by each of the managing virtual servers 31 in the case where the resource with the resource allocation amount calculated in the process S53 is allocated to each of the managing virtual servers 31 (S54). This estimation is made, for example, on the basis of the proportional relationship between the time required for the analyzing process for the operation management data and the resource allocation amount by using the analyzing process time and the history of the resource allocation amount stored in the performance data storage unit 28.

The allocation-amount calculating unit 23 judges whether there exists a managing virtual server 31 having the analyzing process time estimated to exceed a predetermined upper limit time in all the managing virtual servers 31 (S55). If it is judged that such a managing virtual server 31 does not exist (S55; NO), the allocation-amount calculating unit 23 requests the allocation instructing unit 24 to process.

With these operations, the allocation instructing unit 24 instructs each of the physical server devices 3 to allocate a resource with the resource allocation amount calculated by the allocation-amount calculating unit 23 to each of the managing virtual servers 31 (S59). In response to this instruction, each of the physical server devices 3 allocates, to each of the managing virtual servers 31, the resource with the resource allocation amount contained in the instruction given from the management server device 2 for each of the managing virtual servers 31 running on each of the physical server devices 3.

The analyzing process instructing unit 25 instructs each of the managing virtual servers 31 to perform the analyzing process for the operation management data (S60). In response to this instruction, each of the managing virtual servers 31 performs the analyzing process for the operation management data using the resource with the resource allocation amount calculated by the management server device 2.

After giving the instruction to perform the analyzing process, the analyzing process instructing unit 25 acquires the processing time consumed in the analyzing process for the operation management data by each of the managing virtual servers 31, and stores the processing time in the performance data storage unit 28 (S61).

On the other hand, if there exists a managing virtual server 31 having the analyzing process time estimated to exceed the predetermined upper limit time (managing virtual server 31 serving as the transfer target) (S55; YES), the transfer-destination selecting unit 41 determines another managing virtual server 31 (transfer-destination managing virtual server 31) serving as a destination of transfer of the excess data amount and the operation management data on the excess data amount in relation to the managing virtual server 31 serving as the transfer target (S56). A specific example of this process will be described later.

The allocation-amount calculating unit 23 acquires information on the transfer-destination managing virtual server 31 and information on the excess data amount from the transfer-destination selecting unit 41, and re-calculates the resource allocation amount for each of the transfer-destination managing virtual servers 31 (S57). The resource allocation amount re-calculated falls within the range of the amount of resources available in the physical server device 3 on which the transfer-destination managing virtual server 31 is running, this amount being calculated in the process of S52, and is equal to the resource amount corresponding to the operation management data obtained by adding, to the operation management data currently retained by the managing virtual server 31, the operation management data with the excess data amount transferred from the transfer-target managing virtual server 31.

Then, the transmission instructing unit 42 instructs each of the managing virtual servers 31 serving as the transfer target to transfer the operation management data corresponding to the excess data amount calculated by the transfer-destination selecting unit 41 to the transfer-destination managing virtual server 31 selected by the transfer-destination selecting unit 41 (S58). In response to this instruction, data corresponding to the excess data amount in the operation management data retained by the managing virtual server 31 serving as the transfer target are transferred to the transfer-destination managing virtual server 31.

After this, the process S59, the process S60, and the process S61 are performed.

Figure 6:
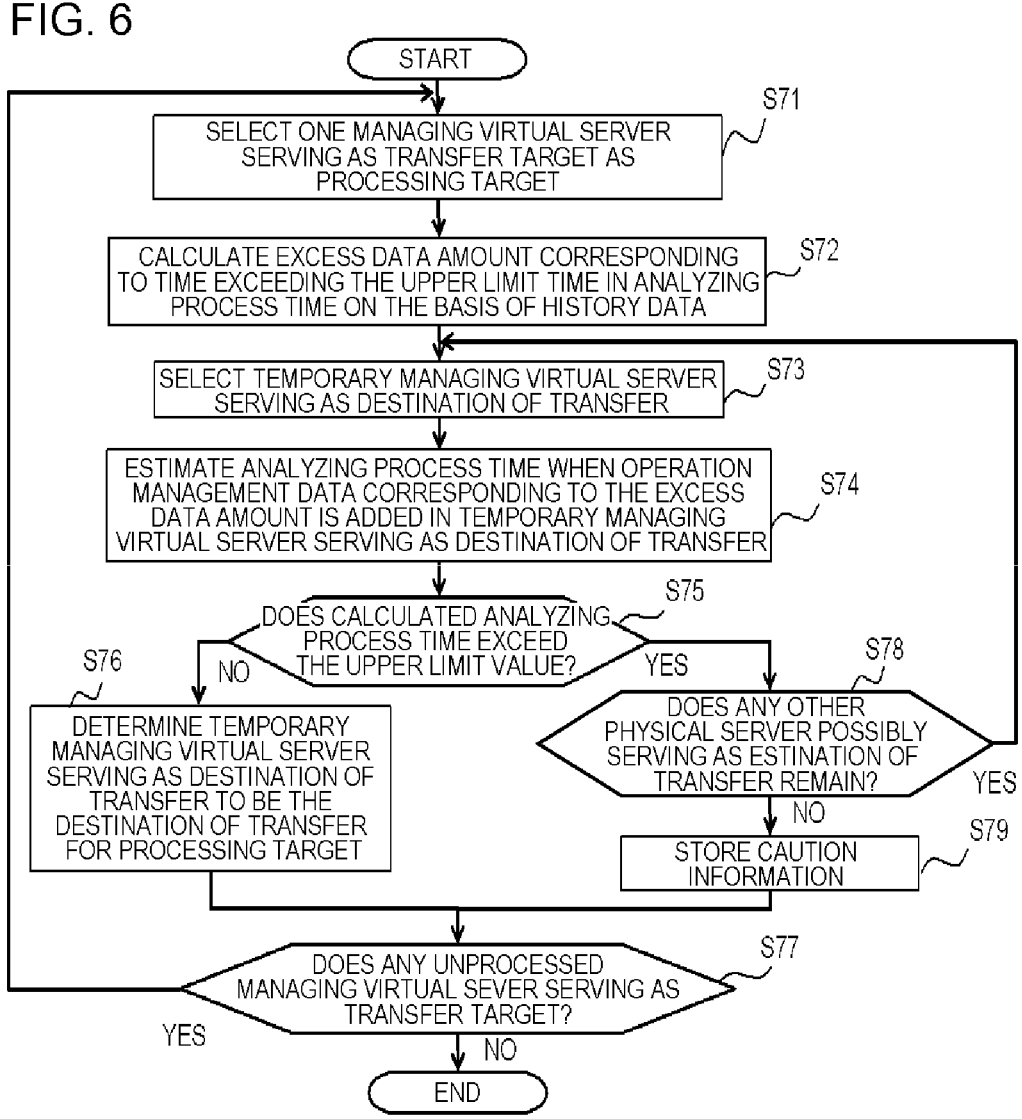
FIG. 6 is a flowchart showing an example of an operation performed by a transfer-destination selecting unit according to the second exemplary embodiment.

FIG. 6 is a flowchart showing an example of an operation performed by the transfer-destination selecting unit 41 according to the second exemplary embodiment. FIG. 6 illustrates a specific example of the process S56 in FIG. 5. First, the transfer-destination selecting unit 41 selects one of the managing virtual servers 31 serving as the transfer target and determined by the allocation-amount calculating unit 23 as the processing target (S71).

The transfer-destination selecting unit 41 estimates the amount of the operation management data that can be processed within the predetermined upper limit time on the basis of the resource allocation amount for the processing target (managing virtual server 31 serving as the transfer target) calculated by the allocation-amount calculating unit 23. This estimation is made on the basis of the proportional relationships between the amount of the operation management data and the time required for analyzing the operation management data and is performed by using the history of the amount of the operation management data stored in the load data storing unit 27 and the history of the analyzing process time stored in the performance data storage unit 28. Then, the transfer-destination selecting unit 41 subtracts the estimated data amount from the amount of operation management data collected from the processing target in the process S51 in FIG. 5 to calculate the excess data amount concerning the processing target (S72).

Next, the transfer-destination selecting unit 41 selects one of the transfer-target managing virtual servers 31 other than the processing target as a temporary transfer-destination managing virtual server (S73).

The transfer-destination selecting unit 41 estimates time required for the analyzing process for the operation management data performed by the temporary transfer-destination managing virtual server 31 in the case where the operation management data with the excess data amount calculated in the process S72 is added (S74). More specifically, the transfer-destination selecting unit 41 obtains the total data amount including the amount of the operation management data collected from the processing target in the process S51 in FIG. 5 and the excess data amount calculated in the process S72 and estimates the time required for the analyzing process for the operation management data with this total data amount. This estimation is made on the basis of the proportional relationships between the amount of the operation management data and the time required for analyzing the operation management data, and is performed by using the history of the amount of the operation management data stored in the load data storing unit 27 and the history of the analyzing process time stored in the performance data storage unit 28.

The transfer-destination selecting unit 41 judges whether the estimated analyzing process time exceeds the predetermined upper limit time (S75). If the analyzing process time does not exceed the predetermined upper limit time (S75; NO), the transfer-destination selecting unit 41 determines the temporary transfer-destination managing virtual server 31 to be the transfer destination for the processing target (S76). On the other hand, if the analyzing process time exceeds the predetermined upper limit time (S75; YES), the transfer-destination selecting unit 41 recognizes that the temporary transfer-destination managing virtual server 31 cannot be set as the transfer destination, and tries to select another managing virtual server 31.

More specifically, the transfer-destination selecting unit 41 judges whether, other than the physical server device 3 on which the temporary managing virtual server 31 is running, there exists any physical server device 3 on which another managing virtual server 31 is running (S78). If such a physical server device 3 exists (S78; YES), the transfer-destination selecting unit 41 selects the managing virtual server 31 running on this physical server device 3 as the temporary transfer-destination managing virtual server 31 (S73). After this, the transfer-destination selecting unit 41 sets the newly selected managing virtual server 31 to the target and performs the processes S74 and thereafter.

If such a physical server device 3 does not exist (S78; NO), the transfer-destination selecting unit 41 judges that the operation management data of the processing target cannot be transferred, and stores caution information concerning the managing virtual server 31 serving as the processing target (S79).

For the processing target, the transfer-destination selecting unit 41 determines the transfer-destination managing virtual server 31 (S76) or stores the caution information (S79), and then, judges whether there exists any unprocessed managing virtual server 31 serving as the transfer target (S77). The transfer-destination selecting unit 41 performs the processes described above until the processes concerning all the managing virtual servers 31 serving as the transfer target complete.

[Operation and Effect of Second Exemplary Embodiment]

As described above, in the second exemplary embodiment, the time required for the analyzing process for the operation management data in each of the managing virtual servers 31 is estimated on the basis of the resource allocation amount determined for each of the managing virtual servers 31, and part of the operation management data on the managing virtual server 31 (managing virtual server 31 serving as the transfer target) having an analyzing process time that exceeds the predetermined upper limit time is transferred to another managing virtual server 31.

At this time, the amount of data transferred (excess data amount) is determined so that the analyzing process for the operation management data is completed in the managing virtual server 31 serving as the transfer target within the predetermined upper limit time. Further, the managing virtual server 31 serving as the destination of transfer is determined so that all the processes of analyzing the operation management data are completed in this managing virtual server 31 serving as the destination of transfer within the predetermined upper limit time even if the excess data amount is transferred. Yet further, on the assumption that the excess data amount is transferred to the managing virtual server 31 serving as the destination of transfer, the resource allocation amount for the managing virtual server 31 serving as the destination of transfer is re-calculated.

Thus, according to the second exemplary embodiment, the load of the analyzing process for the operation management data can be distributed in the virtual server system 10 according to the amount of resource available in each of the physical server devices 3 even in the case where the load of each of the physical server devices 3 and the amount of the operation management data retained by each of the managing virtual servers 31 vary. In other words, according to the second exemplary embodiment, it is possible to systematically and efficiently use the resources within the virtual server system 10 for the analyzing process for the operation management data. This makes it possible to suppress the need for increasing the number of management server devices 2, improving the performance of the management server devices 2, and improving a specific physical server device 3 as much as possible.

It should be noted that, in the plural flowcharts used in the description above, plural steps (processes) are described in a sequential order. However, the order of the process steps in the exemplary embodiments is not necessarily limited to the order described in the exemplary embodiments. In the exemplary embodiments, the order of the process steps illustrated in the drawings may be exchanged, provided that such an exchange does not impair the details of the processes. Further, the above-described exemplary embodiments may be combined, provided that the details thereof do not contradict each other.

Part or all of the exemplary embodiments described above can be described in a manner illustrated in the Supplemental Notes below. However, the exemplary embodiments are not limited to the descriptions below.

[Supplemental Note 1]

A virtual server system including plural physical server devices that each run plural virtual servers and a management server device that can communicate with the plural physical server devices, the plural virtual servers containing a managing virtual server performing an analyzing process for data acquired from a physical server device and another virtual server running on the physical server device, in which the management server device includes: a data collecting unit that collects load data from the plural physical server devices; an available-amount calculating unit that calculates an amount of resource available in each of the physical server devices using the load data collected by the data collecting unit; an allocation-amount calculating unit that calculates a resource allocation amount for the managing virtual server so as to fall within a range of the amount of resource available calculated by the available-amount calculating unit; and an allocation instructing unit that instructs a physical server device on which the managing virtual server is running to allocate, for the managing virtual server, a resource with the resource allocation amount calculated by the allocation-amount calculating unit.

[Supplemental Note 2]

A management server device capable of communicating with plural physical server devices that each run plural virtual servers including a managing virtual server performing an analyzing process for data acquired from a physical server device and another virtual server running on the physical server device, the management server device including:

a data collecting unit that collects load data from the plural physical server devices;

an available-amount calculating unit that calculates an amount of resource available in each of the physical server devices using the load data collected by the data collecting unit;

an allocation-amount calculating unit that calculates a resource allocation amount for the managing virtual server so as to fall within a range of the amount of resource available calculated by the available-amount calculating unit; and an allocation instructing unit that instructs a physical server device on which the managing virtual server is running to allocate, for the managing virtual server, the resource with the resource allocation amount calculated by the allocation-amount calculating unit.

[Supplemental Note 3]

The management server device according to Supplemental Note 2, further including:

an analyzing process instructing unit that instructs the managing virtual server to perform the analyzing process, and acquires time consumed in the analyzing process by the managing virtual server, in which the allocation-amount calculating unit determines an amount of resource allocable so as to fall within the range of the amount of resource available, and calculates the resource allocation amount for the managing virtual server so as to fall within the range of the amount of resource allocable using a predetermined processing time retained in advance and a product of the resource allocation amount that has been already instructed by the allocation instructing unit and the analyzing process time acquired by the analyzing process instructing unit.

[Supplemental Note 4]

The management server device according to Supplemental Note 3, further including:

a performance data storage unit that stores a history of a set of the resource allocation amount that has been already instructed by the allocation instructing unit and the analyzing process time acquired by the analyzing process instructing unit; and a transmission instructing unit that instructs a managing virtual server serving as a transfer target in plural managing virtual servers running on the plural physical server devices to transfer part of data subjected to the analyzing process to a managing virtual server running on another physical server device and serving as a destination of transfer, in which on the basis of the history information stored in the performance data storage unit, the allocation-amount calculating unit estimates, for each of the managing virtual servers, time to be consumed in the analyzing process in the case where the resource allocation amount calculated above is allocated, and determines a managing virtual server having the analyzing process time estimated to exceed a predetermined upper limit time to be the managing virtual server serving as the transfer target from among the plural managing virtual servers.

[Supplemental Note 5]

The management server device according to Supplemental Note 4, further including:

a load data storing unit that stores the load data and a history of an amount of data subjected to the analyzing process in each of the managing virtual servers; and a transfer-destination selecting unit that estimates the amount of data for which the analyzing process can be performed within the predetermined upper limit time for the managing virtual server serving as the transfer target and determined by the allocation-amount calculating unit using the history of the amount of data stored in the load data storing unit and the history of the analyzing process time stored in the performance data storage unit, and subtracts the estimated amount of data from the latest data amount of data subjected to the analyzing process in the managing virtual server serving as the transfer target, thereby calculating the amount of data transferred to the managing virtual server serving as the destination of transfer.

[Supplemental Note 6]

The management server device according to Supplemental Note 5, in which the transfer-destination selecting unit:
    calculates a total data amount formed by the amount of data transferred and the latest data amount of the data subjected to the analyzing process in the managing virtual server serving as the destination of transfer;
    estimates time consumed in the analyzing process for data with the total data amount in the managing virtual server serving as the destination of transfer using the history of the analyzing process time stored in the performance data storage unit and the history of the data amount stored in the load data storing unit; and
    checks that the estimated analyzing process time does not exceed the predetermined upper limit time.

[Supplemental Note 7]

A system managing method performed by a virtual server system including plural physical server devices that each run plural virtual servers and a management server device that can communicate with the plural physical server devices, the system managing method including, at each of the physical server devices, running a managing virtual server as at least one virtual server of the plural virtual servers, the managing virtual server performing an analyzing process for data acquired from each of the physical server devices and another virtual server running on each of the physical server devices, the system managing method further including, at the management server device, collecting load data from the plural physical server devices;

calculating an amount of resource available in each of the physical server devices using the collected load data to;

calculating a resource allocation amount for the managing virtual server so as to fall within a range of the calculated amount of resource available; and instructing a physical server device that runs the managing virtual server to allocate a resource with the calculated resource allocation amount to the managing virtual server.

[Supplemental Note 8]

The system managing method according to Supplemental Note 7, further including:

instructing the managing virtual server to perform the analyzing process; and acquiring time consumed in the analyzing process in the managing virtual server, in which said calculating the resource allocation amount determines an amount of resource allocable so as to fall within the range of the amount of resource available, and calculates the resource allocation amount for the managing virtual server so as to fall within a range of the amount of resource allocable using a predetermined processing time retained in advance and a product of the resource allocation amount that has been already instructed and the acquired analyzing process time.

[Supplemental Note 9]

The system managing method according to Supplemental Note 8, further including:

storing, in a performance data storage unit, a history of a set of the resource allocation amount that has been already instructed and the analyzing process time acquired above;

instructing a managing virtual server serving as a transfer target in plural managing virtual servers running on the plural physical server devices to transfer part of data subjected to the analyzing process to a managing virtual server serving as a destination of transfer and running on another physical server device;

estimating, for each of the managing virtual servers, time consumed in the analyzing process in a case where the calculated resource allocation amount is allocated, on the basis of the history information stored in the performance data storage unit; and determining a managing virtual server having the analyzing process time estimated to exceed a predetermined upper limit time to be the managing virtual server serving as the transfer target from among the plural managing virtual servers.

[Supplemental Note 10]

The system managing method according to Supplemental Note 9, further including:

storing, in a load data storing unit, the load data and a history of an amount of data subjected to the analyzing process in each of the managing virtual servers;

estimating the amount of data for which the analyzing process can be performed within the predetermined upper limit time for the determined managing virtual server serving as the transfer target using the history of the amount of data stored in the load data storing unit and the history of the analyzing process time stored in the performance data storage unit; and subtracting the estimated amount of data from the latest data amount of data subjected to the analyzing process in the managing virtual server serving as the transfer target, thereby calculating the amount of data transferred to the managing virtual server serving as the destination of transfer.

[Supplemental Note 11]

The system managing method according to Supplemental Note 10, further including:

calculating a total data amount formed by the amount of data transferred and the latest data amount of the data subjected to the analyzing process by the managing virtual server serving as the destination of transfer;

estimating time consumed in the analyzing process for data with the total data amount in the managing virtual server serving as the destination of transfer using the history of the analyzing process time stored in the performance data storage unit and the history of the data amount stored in the load data storing unit; and checking that the estimated analyzing process time does not exceed the predetermined upper limit time.

[Supplemental Note 12]

A program performed by a management server device capable of communicating with plural physical server devices each running plural virtual servers including a managing virtual server performing an analyzing process for data acquired from a physical server device and another virtual server running on the physical server device, the program that causes the management server device to realize:

a data collecting unit that collects load data from the plural physical server devices;

an available-amount calculating unit that calculates an amount of resource available in each of the physical server devices using the load data collected by the data collecting unit;

an allocation-amount calculating unit that calculates a resource allocation amount for the managing virtual server so as to fall within a range of the amount of resource available calculated by the available-amount calculating unit; and an allocation instructing unit that instructs a physical server device on which the managing virtual server is running to allocate, for the managing virtual server, the resource with the resource allocation amount calculated by the allocation-amount calculating unit.

[Supplemental Note 13]

The program according to Supplemental Note 12, causing the management server device to further realize:

an analyzing process instructing unit that instructs the managing virtual server to perform the analyzing process, and acquires time consumed in the analyzing process by the managing virtual server, in which the allocation-amount calculating unit determines an amount of resource allocable so as to fall within the range of the amount of resource available, and calculates the resource allocation amount for the managing virtual server so as to fall within the range of the amount of resource allocable using a predetermined processing time retained in advance and a product of the resource allocation amount that has been already instructed by the allocation instructing unit and the analyzing process time acquired by the analyzing process instructing unit.

[Supplemental Note 14]

The program according to Supplemental Note 13 causing the management server device to further realize:

a performance data storage unit that stores a history of a set of the resource allocation amount that has been already instructed by the allocation instructing unit and the analyzing process time acquired by the analyzing process instructing unit; and a transmission instructing unit that instructs a managing virtual server serving as a transfer target in plural managing virtual servers running on the plural physical server devices to transfer part of data subjected to the analyzing process to a managing virtual server running on another physical server device and serving as a destination of transfer, in which on the basis of the history information stored in the performance data storage unit, the allocation-amount calculating unit estimates, for each of the managing virtual servers, time to be consumed in the analyzing process in the case where the resource allocation amount calculated above is allocated, and determines a managing virtual server having the analyzing process time estimated to exceed a predetermined upper limit time to be the managing virtual server serving as the transfer target from among the plural managing virtual servers.

[Supplemental Note 15]

The program according to Supplemental Note 14 causing the management server device to further realize:

a load data storing unit that stores the load data and a history of an amount of data subjected to the analyzing process in each of the managing virtual servers; and a transfer-destination selecting unit that estimates the amount of data for which the analyzing process can be performed within the predetermined upper limit time for the managing virtual server serving as the transfer target and determined by the allocation-amount calculating unit using the history of the amount of data stored in the load data storing unit and the history of the analyzing process time stored in the performance data storage unit, and subtracts the estimated amount of data from the latest data amount of data subjected to the analyzing process in the managing virtual server serving as the transfer target, thereby calculating the amount of data transferred to the managing virtual server serving as the destination of transfer.

[Supplemental Note 16]

The program according to Supplemental Note 15, in which the transfer-destination selecting unit:

calculates a total data amount formed by the amount of data transferred and the latest data amount of the data subjected to the analyzing process in the managing virtual server serving as the destination of transfer;

estimating time consumed in the analyzing process for data with the total data amount in the managing virtual server serving as the destination of transfer using the history of the analyzing process time stored in the performance data storage unit and the history of the data amount stored in the load data storing unit; and checks that the estimated analyzing process time does not exceed the predetermined upper limit time.

[Supplemental Note 17]

A computer-readable storage medium storing the program according to any one of Supplemental Notes 12 to 16.

The present application claims priority based on Japanese Patent Application No. 2011-044150 filed in Japan on Mar. 1, 2011, the disclosures of which are incorporated herein by reference in their entirety.

The invention claimed is:

1. A virtual server system comprising:

a plurality of physical server devices that each run a plurality of virtual servers comprising a managing virtual server, the managing virtual server acquiring data from a physical server device on which the managing virtual server itself is running and from another virtual server running on the physical server device and performing an analyzing process for the acquired data; and a management server device that can communicate with the plurality of physical server devices, the management server device comprising a hardware processor which implements: a data collecting unit that collects, from each of the plurality of physical server devices, load data indicating an amount of hardware resources being used of the physical server device from which the load data is collected an available-amount calculating unit that calculates an amount of resource available in each of the physical server devices on which the managing virtual server is running using the load data collected by the data collecting unit; an allocation-amount calculating unit that calculates a resource allocation amount for the already-running managing virtual server to increase from current resource allocation amount already allocated to the already-running managing virtual server within a range of the amount of resource available calculated by the available-amount calculating unit; and an allocation instructing unit that instructs a physical server device on which the managing virtual server is running to allocate, for the managing virtual server, the resource with the resource allocation amount calculated by the allocation-amount calculating unit;

an analyzing process instructing unit that instructs the managing virtual server to perform the analyzing process, and acquires an analyzing process time, which is time from a start to a finish of the analyzing process; a performance data storage unit that stores a history of a set of the resource allocation amount that has been already instructed by the allocation instructing unit and the analyzing process time acquired by the analyzing process instructing unit; and a transmission instructing unit that instructs a managing virtual server serving as a transfer target in plural managing virtual servers running on the plural physical server devices to transfer part of data subjected to the analyzing process to a managing virtual server running on another physical server device and serving as a destination of transfer, without migrating the virtual server serving as the transfer target onto the physical server device running the managing virtual server serving as the destination of transfer, wherein the allocation-amount calculating unit determines an amount of resource allocable so as to fall within the range of the amount of resource available, and calculates the resource allocation amount for the managing virtual server so as to fall within the range of the amount of resource allocable using a predetermined processing time retained in advance and a product of the resource allocation amount that has been already instructed by the allocation instructing unit and the analyzing process time acquired by the analyzing process instructing unit, and wherein on the basis of the history information stored in the performance data storage unit, the allocation-amount calculating unit estimates, for each of the managing virtual servers, time to be consumed in the analyzing process in the case where the resource allocation amount calculated above is allocated, and determines a managing virtual server having the analyzing process time estimated to exceed a predetermined upper limit time to be the managing virtual server serving as the transfer target from among the plural managing virtual servers.

2. The management server device according to claim 1, wherein the hardware processor further implements:
  a load data storing unit that stores the load data and a history of an amount of data subjected to the analyzing process in each of the managing virtual servers; and
  a transfer-destination selecting unit that estimates the amount of data for which the analyzing process can be performed within the predetermined upper limit time for the managing virtual server serving as the transfer target and determined by the allocation-amount calculating unit using the history of the amount of data stored in the load data storing unit and the history of the analyzing process time stored in the performance data storage unit, and subtracts the estimated amount of data from the latest data amount of data subjected to the analyzing process in the managing virtual server serving as the transfer target, thereby calculating the amount of data transferred to the managing virtual server serving as the destination of transfer.

3. The management server device according to claim 2, wherein the transfer-destination selecting unit:
  calculates a total data amount formed by the amount of data transferred and a latest data amount of the data subjected to the analyzing process in the managing virtual server serving as the destination of transfer; estimates time consumed in the analyzing process for data with the total data amount in the already-running managing virtual server serving as the destination of transfer using the history of the analyzing process time stored in the performance data storage unit and the history of the data amount stored in the load data storing unit; and checks that the estimated analyzing process time does not exceed the predetermined upper limit time.

4. A system managing method performed by a virtual server system comprising a plurality of physical server devices that each run a plurality of virtual servers and a management server device that can communicate with the plurality of physical server devices, the system managing method comprising, at each of the physical server devices, running a managing virtual server as at least one virtual server of the plurality of virtual servers, the managing virtual server acquiring data from a physical server device on which the managing virtual server itself is running and from another virtual server running on the physical server device and performing an analyzing process for the acquired data, the system managing method further comprising, at the management server devices; collecting, from each of the plurality of physical server devices, load data indicating an amount of hardware resources being used of the physical server device from which the load data is collected: calculating an amount of resource available in each of the physical server devices on which the managing virtual server is running using the collected load data; calculating a resource allocation amount for the already-running managing virtual server to increase from current resource allocation amount already allocated to the already-running managing virtual server within a range of the calculated amount of resource available; and instructing a physical server device that runs the managing virtual server to allocate a resource with the calculated resource allocation amount to the managing virtual server; instructing the managing virtual server to perform the analyzing process, and acquiring an analyzing process time, which is time from a start to a finish of the analyzing process; storing a history of a set of the resource allocation amount that has been already instructed and the acquired analyzing process time; instructing a managing virtual server serving as a transfer target in plural managing virtual servers running on the plural physical server devices to transfer part of data subjected to the analyzing process to a managing virtual server running on another physical server device and serving as a destination of transfer, without migrating the virtual server serving as the transfer target onto the physical server device running the managing virtual server serving as the destination of transfer, determining an amount of resource allocable so as to fall within the range of the amount of resource available, and calculating the resource allocation amount for the managing virtual server so as to fall within the range of the amount of resource allocable using a predetermined processing time retained in advance and a product of the resource allocation amount that has been already instructed and the acquired analyzing process time, and wherein on the basis of the history information, estimating, for each of the managing virtual servers, time to be consumed in the analyzing process in the case where the resource allocation amount calculated above is allocated, and determining a managing virtual server having the analyzing process time estimated to exceed a predetermined upper limit time to be the managing virtual server serving as the transfer target from among the plural managing virtual servers.

5. A non-transitory computer-readable storage medium storing a program performed by a management server device capable of communicating with a plurality of physical server devices that each run a plurality of virtual severs comprising a managing virtual server, the managing virtual server acquiring data from a physical server device on which the managing virtual server itself is running and from another virtual server running on the physical server device and performing an analyzing process for the acquired data , the program that causes the management server device to realize, via a hardware processor:
  a data collecting unit that collects, from each of the plurality of physical server devices, load data comprising data indicating an amount of hardware resources being used of the physical server device from which the load data is collected;
  an available-amount calculating unit that calculates an amount of resource available in each of the physical server devices on which the managing virtual server is running using the load data collected by the data collecting unit;
  an allocation-amount calculating unit that calculates a resource allocation amount for the already-running managing virtual server to increase from current resource allocation amount already allocated to the already-running managing virtual server within a range of the amount of resource available calculated by the available-amount calculating unit; and an allocation instructing unit that instructs a physical server device on which the managing virtual server is running to allocate, for the managing virtual server, the resource with the resource allocation amount calculated by the allocation-amount calculating unit;

an analyzing process instructing unit that instructs the managing virtual server to perform the analyzing process, and acquires an analyzing process time, which is time from a start to a finish of the analyzing process; a performance data storage unit that stores a history of a set of the resource allocation amount that has been already instructed by the allocation instructing unit and the analyzing process time acquired by the analyzing process instructing unit; and a transmission instructing unit that instructs a managing virtual server serving as a transfer target in plural managing virtual servers running on the plural physical server devices to transfer part of data subjected to the analyzing process to a managing virtual server running on another physical server device and serving as a destination of transfer, without migrating the virtual server serving as the transfer target onto the physical server device running the managing virtual server serving as the destination of transfer, wherein the allocation-amount calculating unit determines an amount of resource allocable so as to fall within the range of the amount of resource available, and calculates the resource allocation amount for the managing virtual server so as to fall within the range of the amount of resource allocable using a predetermined processing time retained in advance and a product of the resource allocation amount that has been already instructed by the allocation instructing unit and the analyzing process time acquired by the analyzing process instructing unit, and wherein on the basis of the history information stored in the performance data storage unit, the allocation-amount calculating unit estimates, for each of the managing virtual servers, time to be consumed in the analyzing process in the case where the resource allocation amount calculated above is allocated, and determines a managing virtual server having the analyzing process time estimated to exceed a predetermined upper limit time to be the managing virtual server serving as the transfer target from among the plural managing virtual servers.

* * * * *